United States Patent [19]

Arthurs

[11] Patent Number: 5,460,870
[45] Date of Patent: Oct. 24, 1995

[54] POLYURETHANE FOAM LAMINATES

[75] Inventor: Trevor C. Arthurs, Kingston, Canada

[73] Assignee: Du Pont Canada Inc., Mississauga, Canada

[21] Appl. No.: 229,433

[22] Filed: Apr. 12, 1994

[30] Foreign Application Priority Data

Apr. 14, 1993 [GB] United Kingdom .................. 9307645

[51] Int. Cl.$^6$ ............................. B32B 3/26; B32B 7/12; B32B 17/10; B32B 27/12
[52] U.S. Cl. ....................... 428/285; 428/286; 428/317.1; 428/317.7; 428/319.1
[58] Field of Search .................................... 428/286, 285, 428/317.1, 317.7, 319.1

[56] References Cited

U.S. PATENT DOCUMENTS

| | | | |
|---|---|---|---|
| 4,612,155 | 9/1986 | Wong et al. | 264/176 |
| 5,300,360 | 4/1994 | Kocsis et al. | 428/304.4 |
| 5,342,884 | 8/1994 | Tabor et al. | 525/80 |

FOREIGN PATENT DOCUMENTS 2032280  12/1990  Canada .
238472   2/1987   European Pat. Off. .

*Primary Examiner*—Thomas Hamilton, III
*Attorney, Agent, or Firm*—Craig H. Evans

[57] ABSTRACT

A structure is disclosed comprising a layer of polyurethane foam bonded to at least one layer of another material, especially a layer of fibreglass matte, a layer of cellulosic material e.g. cardboard, and/or a layer of polyurethane foam. The layers are bonded together with an adhesive of polyethylene or polypropylene that has been grafted with an ethylenically unsaturated dicarboxylic acid or anhydride thereof, the adhesive containing at least 0.03% by weight of said acid or anhydride. The structure exhibits a temperature for heat-fail resistance in shear of at least 90° C. In embodiments, the polyurethane foam is a rigid polyurethane foam, and the polyethylene and polypropylene have been grafted with fumaric acid, maleic acid or maleic anhydride. As an example, the structure is comprised of a layer of fibreglass matte, at least one layer of polyurethane foam and a layer of fibreglass matte, the layers being bonded together with the adhesive. The structure may be used as so-called headliners in automobiles.

17 Claims, No Drawings

POLYURETHANE FOAM LAMINATES

The present invention relates to laminates of polyurethane foam and especially to laminates of polyurethane foam with fibreglass matte, cellulasic structures e.g. cardboard, and/or polyurethane foam. In particular, the invention relates to such laminates having a temperature for heat-fail resistance in shear, a measurement of the temperature at which delamination of a laminate occurs, of at least 70° C.

Laminates of polyurethane foams with fibreglass matte and/or cardboard are used in a number of end-uses, particularly in the form of liners for passenger compartments of automobiles i.e. as so-called headliners. Such liners are often multi-layered structures, usually having an outer layer of a fabric material for aesthetic reasons. The traditional adhesive for such structures is a polyurethane adhesive, which has given liners of acceptable structural properties. However, polyurethane adhesives are increasingly in disfavour because of environmental and occupational health objections to the use of isocyanate-containing adhesives. Thus, alternate adhesives are required that do comply with environmental and occupational health requirements, as well as meet product specifications for the resultant bonded structure. Moreover, any such adhesive should be economical.

As used herein, a "rigid foam" is defined according to the specifications in ASTM D1566-82 entitled "Definitions of Terms Relating to Rubber".

As used herein, "temperature for heat-fail resistance in shear" is measured according to the procedure of ASTM D4498 entitled Heat-Fail Temperature in Shear of Hot-Melt Adhesives, except that the weight used was 300 g; use of heavier weights may result in physical failure of the polyurethane foam layer.

It has now been found that polyethylene and polypropylene grafted with an ethylenically unsaturated dicarboxylic acid or anhydride, optionally in the form of grafted polymer blended with ungrafted polymer, may be used in the bonding of polyurethane foam structures, without the use of isocyanates.

Accordingly, the present invention provides a structure comprising:
a layer of polyurethane foam bonded to at least one of a layer of fibreglass matte, a layer of cellulosic material and a layer of polyurethane foam; said layers being bonded together with an adhesive of polyethylene or polypropylene that has been grafted with an ethylenically unsaturated dicarboxylic acid or anhydride thereof, or derivative thereof, said adhesive containing at least about 0.03% by weight of said acid or anhydride; and
said structure exhibiting a temperature for heat-fail resistance in shear of at least 70° C., preferably at least 90° C.

In a preferred embodiment of the structure, the polyurethane foam is a rigid polyurethane foam.

In a further embodiment, the polyethylene and polypropylene have been grafted with at least one of fumaric acid, maleic acid, maleic anhydride, maleimide, nadic anhydride and acrylic acid, or derivatives thereof.

In another embodiment, the structure is comprised of a layer of fibreglass matte, at least one layer of polyurethane foam and a layer of fibreglass matte, the layers being bonded together with said adhesive.

The present invention provides a structure comprising:
a layer of polyurethane foam bonded to at least one of a layer of another material;
said layers being bonded together with an adhesive of polyethylene or polypropylene that has been grafted with an ethylenically unsaturated dicarboxylic acid or anhydride thereof, or derivative thereof, said adhesive containing at least about 0.03% by weight of said acid or anhydride; and
said structure exhibiting a temperature for heat-fail resistance in shear of at least 70° C., preferably at least about 90° C.

The present invention relates to structures of polyurethane foam laminated to other materials, and will be particularly described with reference to laminates to fibreglass matte, cellulosic material and/or polyurethane foam, especially with respect to use of fibreglass matte. The cellulosic material is particularly in the form of a cardboard but other forms of cellulosic material, especially relatively flexible cellulosic material may be used. The surface of the cellulosic material may be treated, provided that any such treatment does not significantly adversely affect the bonding mechanism e.g. polyethylene-coated cardboard may be used. The fibreglass is in the form of a layer of fibreglass matte. It would normally be flexible to the extent that the layer is capable of being bent or shaped to conform to a curved surface e.g. the shape of a headliner in an automobile. The fibreglass may be treated with a finish e.g. a size or primer, as long as the finish does not significantly adversely affect the bonding mechanism. The thickness of the fibreglass matte may be varied over a wide range, although it is preferred that the matte be relatively thin, to prevent or reduce the likelihood of delamination of the matte. In one embodiment, the thickness is about 0.05 cm and the fibreglass matte is a non-woven matte formed from glass fibres having a length of about 5 cm.

The polyurethane foam may be and preferably is a rigid foam, although it may also be a flexible foam. If the foam is a rigid foam, it preferably possesses a small degree of flexibility, so that it is capable of being conformed to the shape of a curved surface, although an inflexible rigid foam could be formed into the required shape using a thermoforming or other process. The thickness of the polyurethane foam may be varied over a wide range, although in one embodiment it is preferred that the foam be relatively thin for convenience and for versatility in the manufacturing process. As an example, in one embodiment the thickness is about 0.5 cm. The pore size of the foam may be varied over a wide range, a preferred range being 0.1–1.0 mm.

The adhesive is a grafted polyethylene or grafted polypropylene. The polymer may be grafted polymer per se or in the form of an un-grafted polymer blended with a grafted polymer. The polymer may be a homopolymer of ethylene or a copolymer of ethylene with a minor amount e.g. up to 20% by weight, of at least one higher hydrocarbon alpha-olefin having 3–20, especially 3–10 and particularly 4–10, carbon atoms. Examples of the higher hydrocarbon alpha-olefins include propylene, butene-1, 4-methyl pentene-1, hexene-1 and octene-1, and mixtures thereof, or mixtures of two or more of the higher hydrocarbon alpha-olefins. Such polymers may have a density of from about 0.850 g/cm$^3$ up to about 0.965 g/cm$^3$, especially 0.890 g/cm$^3$ up to about 0.965 g/cm$^3$ i.e. the polymers include so-called high density polyethylene, low density polyethylene and very low density polyethylene, especially polyethylene having a density of at least 0.940 g/cm$^3$. However, the temperature of bonding permissible or achievable in the process of manufacture of the structures may dictate that a polyethylene of lower density, or lower melting point, be used. In addition, the polymers have a melt index, as measured by the procedure of ASTM D1238 (Condition E), in the range of from about 0.1 dg/min to about 200 dg/min, especially 1–80 dg/min and in particular in the range 2–70 dg/min. Alternatively, the polymer may be a polypropylene, especially a homopolymer of propylene or a copolymer of propylene and a minor amount of ethylene. Such polymers are known and are available commercially.

The polymer is grafted with an ethylenically unsaturated dicarboxylic acid or anhydride, or derivatives thereof. Preferred examples of such an acid or anhydride are fumaric acid, maleic acid, maleic anhydride, maleimide, nadic anhydride, acrylic acid, citraconic acid, citraconic anhydride, itaconic acid, itaconic anhydride, endo-bicyclo-[2.2.1]-5-heptene-2,3 dicarboxylic acid, endo-bicyclo-[2.2.1]-5-heptene-2,3 dicarboxylic acid anhydride, cis-4-cyclohexene 1,2 dicarboxylic acid, cis-4-cyclohexene 1,2 dicarboxylic acid anhydride, and derivatives thereof. Metal salts, anhydrides, esters, amides or imides of the above acids may also be useful. Ordinary skill and experimentation may be necessary in selecting any particular grafting monomer, depending on the performance requirements of the particular application. Maleic acid and maleic anhydride are especially preferred. The grafted polymer should contain at least about 0.03%, by weight, of the grafted monomer. In preferred embodiments, the grafted polymer contains at least 0.07% and especially at least 0.10% by weight of grafted monomer. Examples of such grafted polymers are available commercially, for instance from Du Pont Canada Inc. under the trade mark Fusabond or may be manufactured by processes known in the art. An example of the latter is the process described in U.S. Pat. No. 4,612,155 of C. S. Wong and R. A. Zelonka, which issued 1986 Sep. 16.

The adhesive may contain additives provided that such additives do not detract from the performance of the adhesive. A variety of materials are commonly used and known in the adhesive art, such as, for example, antioxidants, surface modifiers, stabilizers, fillers, extenders, waxes, foaming agents, pigments, anti-static agents, and crosslinking agents.

Antioxidants generally protect the stability of the adhesive when subjected to heat, or during long term storage in bulk form. Suitable antioxidants include typical hindered phenols such as for example, butylated hydroxytolunes (BHT), ETHYL® 330 and IRGANOX® 1010, believed to be neopentanetetrayl 3,5-di-tert-butyl- 4-hydroxy cinnamate, as well as phosphites.

Surface modifiers, such as for example, amide slip agents, such as stearamide, and silica can be used to advantage in adhesive compositions of this invention.

Certain additives customarily employed in adhesive formulations may interfere with the bonding ability of compositions of this invention. The practioner of ordinary skill will be able to determine the negative effect of a potential additive with minimum experimentation.

The structure of the invention is in the form of a laminate of a layer of polyurethane foam bonded or laminated to a layer of fibreglass matte and/or a layer of polyurethane foam. That structure is bonded together by the adhesive described above. In embodiments, the structure is a multi-layered structure. For instance, the structure could be comprised of layers of, in sequence, fibreglass matte, polyurethane foam and fibreglass matte, or a layer of fibreglass matte, multiple layers of polyurethane foam and another layer of fibreglass matte. For example, the structures could be:

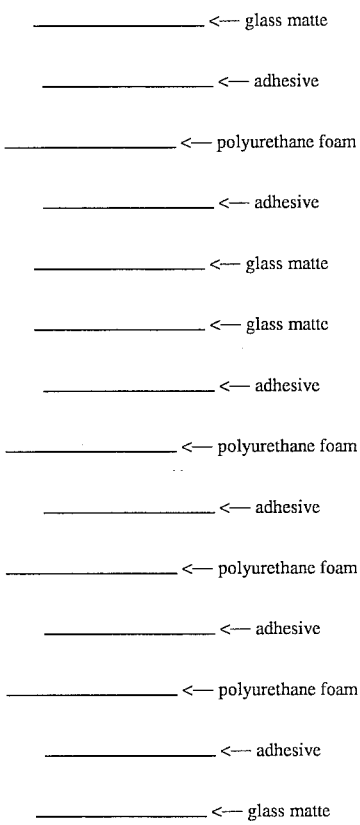

In the preferred end-use, the individual layers are relatively thin e.g. in the range of 0.2–1.0 cm for the polyurethane foam and in the range of 0.02–0.1 cm for fibreglass matte. However, the thickness of the layers is primarily determined by the intended end-use.

The structure may be manufactured by laminating the layers in a press under heat and pressure. For instance, the various layers may be formed into a sandwich of the required construction and then inserted into the press. The temperature and period of time in the press will depend on, for example, the particular construction and thickness thereof as well as the particular grafted polyethylene or polypropylene selected for the adhesive layer. Examples of temperatures and pressures are given in the examples below. Alternatively, the adhesive may be applied in powder form, as a non-woven sheet or by using a porous coat system e.g. a coating system that applies a fibre or web e.g. a number of random strands, of adhesive onto a substrate and essentially forms a non-woven adhesive layer. The adhesive could also be the outer layer of a multi-layer laminate.

In one embodiment of processes for the manufacture of headliners, steam is injected into the mould during the bonding process at a temperature sufficient to melt the adhesive, with the entire headliner panel being under pressure; open-celled foams permit the escape of any steam used during the bonding process. The foam may be formed by the reaction of a polyisocyanate with a polyol using a foaming agent that is a gaseous hydrocarbon or fluorocarbon, or other inert gas, e.g. nitrogen. Thermoforming-type bonding processes e.g. with the adhesive pre-applied to one of the layers or components of the laminate or inserted separately into the process, may also be used.

The laminated structure is preferably sufficiently flexible so as to be moulded to the shape of a mould, although as noted above it is possible to use inflexible layers e.g. inflexible polyurethane layers, may be used. Such a mould would normally be a curved mould e.g. as in a headliner for an automobile, with relatively few sharp angles. In such a use, the structure would normally be bonded to at least one additional layer e.g. a layer of fabric material which would be the visible layer e.g. the layer visible inside the automobile. The structure may also be bonded to other materials e.g. aluminum foil, other metals and other polyolefins for automotive or other end-uses. Examples of the latter include thermal insulation materials for the construction industry, insulation for refrigerated truck trailers, bodies and railcars, and insulation for oil tanks, and the like.

The structures of the invention have a temperature of heat-fail resistance in shear of at least 70° C. and preferably at least 90° C. Such temperatures are important in the automotive industry, for example, because headliners tend to get hot when the automobile is sitting in the sun and acceptable temperature preformance is required.

Although the present invention has been described herein with particular reference to the bonding of glass matte to rigid polyurethane foam, the invention may also be used in the bonding of rigid polyurethane foam to rigid polyurethane foam, glass matte to flexible polyurethane foam, and other combinations of rigid polyurethane foam, flexible polyurethane foam and glass matte, bonding to cellulosic materials, and including the bonding of like and of dissimilar materials.

The present invention is illustrated by the following examples.

EXAMPLE I

A laminate of fibreglass matte and a polyurethane foam was formed, with the layers being bonded together using a film of adhesive. The fibreglass was a non-woven matte having a thickness of approximately 0.5 mm that had been formed from glass fibres having a length of about 5 cm. The polyurethane foam was a polyether polyurethane identified by the trade mark "Foamex", with a density of about 0.025 g/cm$^3$, a thickness of 0.5 cm and pore sizes that were predominantly in the range of 0.25–0.5 mm. The adhesive film was in sheet form, with a thickness of 0.18 mm.

The adhesive was formed from a polymer, and optionally contained a grafted polymer; the grafted polymer, when used, was used as a blend with the indicated polymer in an amount of 10% by weight. The polymer was a polyethylene, the polymers with densities of about 0.96 being homopolymers of ethylene and the polymers with lower densities being copolymers of ethylene and butene-1. The grafted polymer was a high density linear ethylene homopolymer having a density of 0.96 g/cm$^3$, a melt index in the range of 2.0 dg/min and which had been grafted with 1% by weight of maleic anhydride.

The structure was laminated by heating in a press at a temperature of 140° C. for 30 seconds under a pressure of 103 kPa.

The laminate obtained was tested using the procedure of ASTM D4498, except that because of the lack of strength of the polyurethane foam under test conditions, the weight used was 300 g. One part of the laminate was clamped and the other part, with weight attached, was allowed to hang freely. The sample was located in a temperature controlled oven. The test involved increasing the temperature of the oven until the adhesive bond failed.

Further details and the results obtained are given in Table I.

TABLE I

| Run No. | Polymer Density | Melt Index | Contains Grafted Polymer | Fail Temp. (°C.) |
|---|---|---|---|---|
| 1 | 0.895 | 12 | no | 82.0 |
| 2 | 0.930 | 73 | no | 99.4 |
| 3 | 0.959 | 65 | no | 86.7 |
| 4 | 0.895 | 12 | yes | 120 |
| 5 | 0.930 | 73 | yes | 110 |
| 6 | 0.959 | 65 | yes | >120 |

The results show that the presence of maleic-anhydride grafted polyolefin greatly improves the temperature performance, as compared to the un-grafted polyolefin composition.

EXAMPLE II

The procedure of Example I was repeated, bonding a rigid polyurethane foam to rigid polyurethane foam using the maleic-anhydride grafted polyethylenes of Example I. The results obtained are given in Table II.

TABLE II

| Run No. | Polymer Density | Melt Index | Contains Grafted Polymer | Fail Temp. (°C.) |
|---|---|---|---|---|
| 7 | 0.895 | 12 | yes | 129.0 |
| 8 | 0.930 | 73 | yes | 130.7 |
| 9 | 0.959 | 65 | yes | 137.7 |

The results show that the grafted polyolefin adhesive blend provided outstanding heat resistance.

EXAMPLE III

A laminate of fibreglass matte and polyurethane foam was formed, with the layers being bonded together using a film of adhesive, following the procedure of Example I.

The laminates were subjected to a creep test, using samples as prepared in Example I for the shear adhesion fail test of ASTM D4498. The test sample was placed in a temperature-controlled oven using a 100 g weight; one part of the laminate was clamped and the other part, with weight attached, was allowed to hang freely. The samples were kept at a controlled temperature for one month, after which the temperature was raised by 10° C. and the procedure repeated. The temperature at which the adhesive bond failed was recorded.

Further details and the results obtained are given in Table III.

TABLE III

| Run No. | Adhesive | Creep Failure Temp (°C.) | SAFT* (°C.) |
|---|---|---|---|
| 10 | A | 140 | 138 |
| 11 | B | 140 | 137 |
| 12 | C | >150 | 149 |
| 13 | D | >150 | 130 |
| 14 | E | 140 | 119 |
| 15 | F | 110 | 91 |
| 16 | G | 110 | 88 |

*SAFT = Heat Fail Temperature in Shear

TABLE III-continued

| Run No. | Adhesive | Creep Failure Temp (°C.) | SAFT* (°C.) |
| --- | --- | --- | --- |

Adhesive A = 85.65% ungrafted high density polyethylene; 14% grafted high density polyethylene (0.9585 g/cm³, melt index of 3 dg/min, 1.0% by weight of maleic anhydride); 0.35% neopentanetetrayl 3,5-di-tert-butyl-4-hydroxy cinnamate antioxidant, final composition having a melt index of 4.3 dg/min and 0.14% by weight of maleic anhydride
Adhesive B = 83.2% ungrafted high density polyethylene; 16.7% grafted high density polyethylene (0.9585 g/cm³, melt index of 3 dg/min, 1.0% by weight of maleic anhydride); 0.1% neopentanetetrayl 3,5-di-tert-butyl-4-hydroxy cinnamate antioxidant, final composition having a melt index of 4.7 dg/min and 0.17% by weight of maleic anhydride)
Adhesive C = 77% by weight of polypropylene; 20% by weight of linear low density polyethylene and 3% by weight of grafted polypropylene, the final composition having a melt index of 3.6 dg/min and containing 0.10% by weight of maleic anhydride
Adhesive D = 90% high density polyethylene (0.959 g/cm³, and melt index of 65 dg/min); 10% grafted high density polyethylene (0.9583 g/cm³, melt index of 3 dg/min and containing 1.0% by weight of maleic anhydride
Adhesive E = 80% high density polyethylene (0.959 g/cm³, melt index of 65 dg/min); 20% grafted high density polyethylene (0.9585 g/cm³, melt index of 3 dg/min and containing 1.0% by weight of maleic anhydride)
Adhesive F = zinc ionomer, melt index of 5.2 dg/min
Adhesive G = zinc ionomer, melt index of 0.7 dg/min The samples of the adhesives of the invention gave substantially better creep results than the samples based on ionomers. The grafted adhesives gave better shear adhesion fail temperatures than the related ungrafted adhesives.

I claim:

1. A structure comprising:

a layer of polyurethane foam bonded to at least one of a layer of another material;

said layers being bonded together with an adhesive of polyethylene or polypropylene that has been grafted with an ethylenically unsaturated dicarboxylic acid or anhydride thereof, or derivative thereof, said adhesive containing at least about 0.03% by weight of said acid or anhydride; and said structure exhibiting a temperature for heat-fail resistance in shear of at least 70° C.

2. The structure of claim 1 in which the temperature for heat-fail resistance in shear is at least 90° C.

3. A structure comprising:

a layer of polyurethane foam bonded to at least one of a layer of fibreglass matte, a layer of cellulosic material and a layer of polyurethane foam;

said layers being bonded together with an adhesive of polyethylene or polypropylene that has been grafted with an ethylenically unsaturated dicarboxylic acid or anhydride thereof, or derivative thereof, said adhesive containing at least about 0.03% by weight of said acid or anhydride; and said structure exhibiting a temperature for heat-fail resistance in shear of at least 70° C.

4. The structure of claim 3 in which the temperature for heat-fail resistance in shear is at least 90° C.

5. The structure of claim 1 in which the polyurethane foam is a rigid polyurethane foam.

6. The structure of claim 1 in which the polyethylene and polypropylene have been grafted with at least one of fumaric acid, maleic acid, maleic anhydride, maleimide, nadic anhydride, acrylic acid, citraconic acid, citraconic anhydride, itaconic acid, itaconic anhydride, endo-bicyclo-[2.2.1]-5-heptene-2,3 dicarboxylic acid, endo-bicyclo-[2.2.1]-5-heptene-2,3 dicarboxylic acid anhydride, cis-4-cyclohexene-1,2 dicarboxylic acid, cis-4-cyclohexene 1,2 dicarboxylic acid anhydride, and derivatives thereof.

7. The structure of claim 2 in which the polyethylene and polypropylene have been grafted with at least one of fumaric acid, maleic acid, maleic anhydride, maleimide, nadic anhydride, acrylic acid, citraconic acid, citraconic anhydride, itaconic acid, itaconic anhydride, endo-bicyclo-[2.2.1]-5-heptene-2,3 dicarboxylic acid, endo-bicyclo-[2.2.1]-5-heptene-2,3 dicarboxylic acid anhydride, cis-4-cyclohexene 1,2 dicarboxylic acid, cis-4-cyclohexene 1,2 dicarboxylic acid anhydride, and derivatives thereof.

8. The structure of claim 1 in which the structure is comprised of layers of glass matte and polyurethane foam.

9. The structure of claim 1 in which the structure is comprised of a layer of fibreglass matte, at least one layer of polyurethane foam and a layer of fibreglass matte, the layers being bonded together with said adhesive.

10. The structure of claim 1 in which the adhesive is grafted polyethylene.

11. The structure of claim 1 in which the adhesive is grafted polypropylene.

12. The structure of claim 10 in which the polyethylene is high density polyethylene.

13. The structure of claim 10 in which the polyethylene is low density or very low density polyethylene.

14. The structure of claim 1 in which the adhesive contains at least 0.7% by weight of grafted acid or anhydride.

15. The structure of claim 1 in which the layers of polyurethane foam have a thickness of 0.2–1.0 cm and the fibreglass matte has a thickness of 0.02–0.1 cm.

16. The structure of claim 1 in which each layer has sufficient flexibility to be able to be bent or shaped to conform to a curved surface.

17. The structure of claim 1 in which the adhesive is formed form a blend of grafted and ungrafted polyethylene or polypropylene.

* * * * *